United States Patent [19]

Moellmann

[11] 4,147,024
[45] Apr. 3, 1979

[54] DUAL CYCLE GAS TURBINE ENGINE SYSTEM

[75] Inventor: Heinz F. Moellmann, New Haven, Conn.

[73] Assignee: Avco Corporation, Stratford, Conn.

[21] Appl. No.: 833,532

[22] Filed: Sep. 15, 1977

[51] Int. Cl.$^2$ .............................. F02C 7/00; F02C 7/08
[52] U.S. Cl. ............................ 60/39.15; 60/34.16 R; 60/34.51 R
[58] Field of Search ......... 60/39.15, 39.16 S, 39.51 R, 60/39.51 H, 39.16 R

[56] References Cited

U.S. PATENT DOCUMENTS

| | | | |
|---|---|---|---|
| 2,814,181 | 11/1957 | Schwartz | 60/39.51 R |
| 2,930,190 | 3/1960 | Rogers | 60/39.51 R |
| 2,981,063 | 4/1961 | Wickmann | 60/39.16 S |

Primary Examiner—Louis J. Casaregola
Attorney, Agent, or Firm—Irwin P. Garfinkle; Robert J. McNair, Jr.; Ralph D. Gelling

[57] ABSTRACT

A dual cycle turbine system is presented which includes a combination of two engines with different cycle pressure ratios. The two engines are cross connected by a common regenerator that enables low specific fuel consumption under partial load conditions.

8 Claims, 4 Drawing Figures

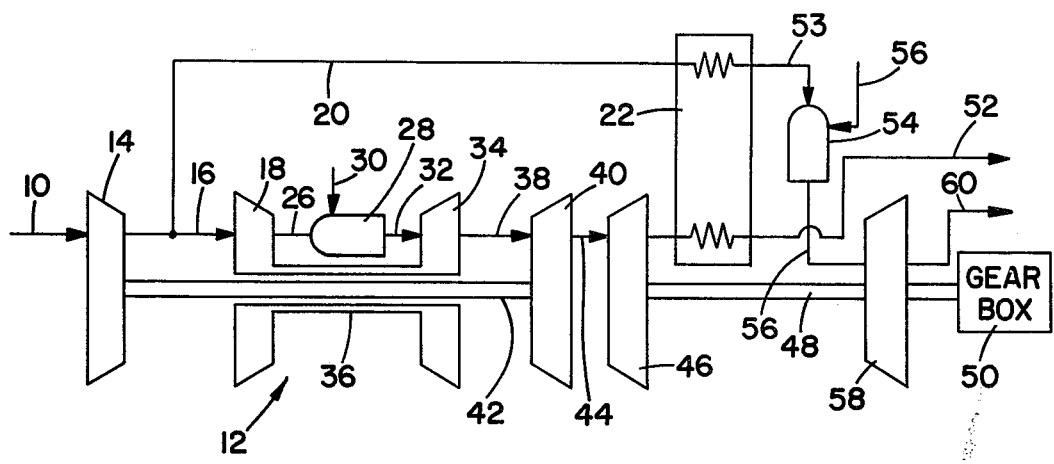
_Fig 1_
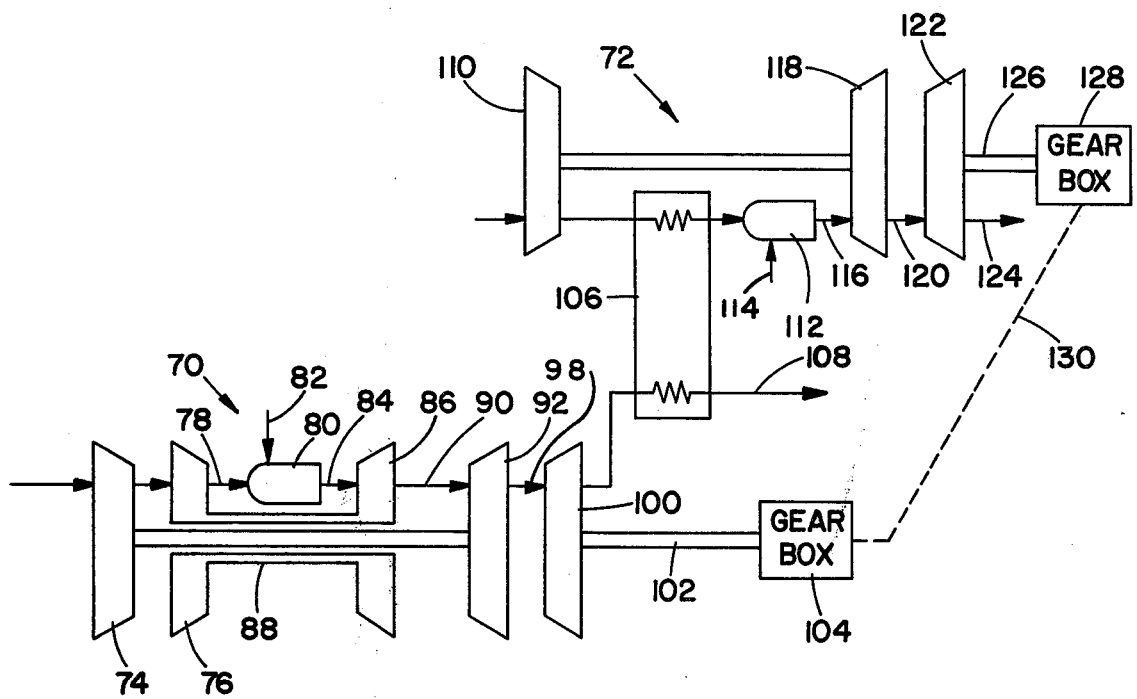
_Fig 2_

DUAL CYCLE GAS TURBINE ENGINE SYSTEM

BACKGROUND OF THE INVENTION

This invention pertains to compact and lightweight turbine propulsion systems with improved part load fuel consumption. Most turbine users would prefer the simple Brayton cycle engine (Jet Aircraft Power Systems by Casamassa and Bent, McGraw-Hill Book Company, 1957 discusses the Brayton cycle). In the 2000 to 5000 SHP Class it is possible to obtain a specific fuel consumption of 0.42 lb/hr/SHP at maximum power using a Brayton cycle turbine. This performance has been achieved with a pressure ratio at the compressor of 16 to 1 and a cycle temperature of 2200 degrees F. Under partial load conditions, however, this same engine burns more fuel per unit of output. At 50 percent load, the specific fuel consumption may increase to 0.5 lb/hr/SHP.

One means of improving fuel efficiency under part load conditions is to use a regenerative cycle engine. U.S. Pat. No. 3,222,864 to Dyste et al. is an example of such an engine. The regenerative gas turbine engine includes a waste heat recovery device which preheats the inlet air as it leaves the compressor, using the heat from the turbine exhaust gases.

The U.S. Pat. No. 3,011,311 to Williams et al. discloses another approach for using a heat exchanger for improving fuel economy. U.S. Pat. No. 3,032,989 to Oprecht is another example of a gas turbine operating on the regenerative principle. U.S. Pat. No. 3,302,397 to Davidovic shows how a heat exchanger can be used to cool critical components within a turbine engine.

Regarding heat exchangers adapted for use on turbine engines, there are many examples in the literature. The following U.S. Pat. Nos. exemplify the art: 3,143,166 to Williams et al.; 3,222,864 to Dyste et al.; 3,228,464 to Stein et al.; 3,424,240 to Stein et al.; 3,785,435 to Stein et al; 3,831,674 to Stein et al.; and, 4,008,569 to Bennett.

With regenerative turbine engines the lowest specific fuel consumption can be moved to the 40 to 60 percent of maximum power range. In the past, most turbine users have tended to avoid the regenerative system in favor of the simpler Brayton cycle engine. However, with the increase in fuel costs, the use of a regenerator becomes more cost effective.

Multiple cycle turbine installations have long been used in large power plants where horsepower to weight ratios are not critical. U.S. Pat. No. 2,654,217 to Rettaliata is an example of a gas turbine system embodying a high pressure turbine and a low pressure turbine operating cooperatively to obtain optimum efficiency for part load conditions.

None of the above provide the features of my dual cycle turbine system. Using a combination of two engines with different pressure ratios and a cross connected common regenerator, I obtain low specific fuel consumption at both full and part load while at the same time have an engine system with a maximum output of about 4 HP per pound of engine weight.

SUMMARY OF THE INVENTION

The dual cycle system which is the subject of my invention combines two turbine engine sections into an integrated whole. The exhaust heat energy of a high pressure engine section is used to preheat the air furnished to the combustor of a medium pressure second engine section. The high pressure engine section includes a two-spool compressor at the input. The pressure ratio of this two-spool compressor will run at least 16 to 1. The output of the second compressor serves as the input to a high pressure combustor. Hot gas from the combustor drives a multi-stage turbine. Each of the first two turbine stages furnishes power to one of the compressor spools. The final turbine section drives an output shaft to power the load. Heat remaining in the gas stream at the output of the turbine sections is recovered in a heat exchanger. The heat thus recovered, is used to preheat the airstream being fed to the burner of a moderate pressure ratio engine section. By adding heat at the burner of the second engine section, the power available from the moderate pressure engine can be almost doubled. Power from the output turbine stages of the second engine section can be cooperatively coupled to the output shaft of the first engine section.

It can be shown by thermodynamic analysis that part load specific fuel consumption of my engine is at least 10 percent better than that of a single Brayton cycle engine operating at full power. One reason for this improved specific fuel consumption obtainable with a compact and low weight engine is that the heat exchanger does not have to handle more than half of the total gas produced by the propulsion system.

BRIEF DESCRIPTION OF THE DRAWINGS

FIG. 1 is a schematic cross-section of a dual cycle turbine system wherein heat from the high pressure turbine section is used to preheat the air going to the combustor of the moderate pressure turbine section.

FIG. 2 is a schematic cross-section of an alternate version of the dual cycle turbine system.

DETAIL DESCRIPTION OF THE PREFERRED EMBODIMENTS

Figure 3:
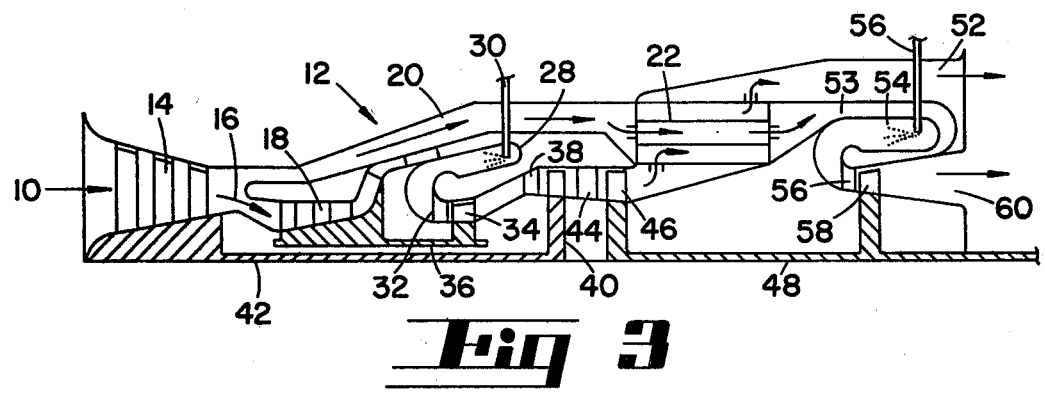
FIG. 3 is a partial cutaway view of the dual engine configuration shown in FIG. 1.

The details of the invention will be described by reference to FIGS. 1 and 3, which show an arrangement, where the two engine sections (high pressure section and low pressure section) are integrated into a singular embodiment to the largest extent. Parts of like functions are designated by like numbers in FIGS. 1 and 3.

Incoming air 10 enters dual cycle turbine engine 12 at first compressor 14. Compressor 14 would nominally have a pressure ratio of about 4:1 although in some designs the pressure ratio could be as high as 6:1. Air out of first compressor 14 divides into two parts. One part is ducted along passage 16 to second compressor 18. The other portion of the airstream is ducted along passage 20 to heat exchanger 22. The two compressors 14 and 18 act in combination on the incoming airstream to provide a pressure ratio typically between 16:1 to 24:1. The high pressure airstream in passage 26 serves as the input to first combustor 28. Fuel is furnished to first combustor 28 by means of fuel supply line 30.

The hot burned gases leave first combustor 28, pass through first stage turbine nozzle 32 and then through the blades of high pressure turbine 34. High pressure turbine 34 powers second compressor 18 by means of hollow shaft 36. The gases leaving high pressure turbine 34 pass through second stage nozzles 38 and then through medium pressure turbine 40. Medium pressure turbine 40 powers first compressor 14 via shaft 42. Again the hot gas stream is passed through a stage of turbine nozzles 44 and through a third turbine 46. Power from turbine 46 is extracted through output shaft 48. Shaft 48 may drive an aircraft propeller or ground vehicle (not shown) after an appropriate step-down in a gearbox (see gearbox 50 in FIG. 1).

Much of the exhaust heat energy remaining in the burned gases exiting turbine 46 is extracted by means of heat exchager 22 before the spent products of combustion from the high pressure turbine stage are vented at tail pipe 52.

The energy extracted by heat exchanger 22 is used to heat the airstream entering along passage 20. After being heated in heat exchanger 22 this airstream, which was originally pressurized in first compressor stage 14, is injected via annular duct 53 into second combustor 54. Fuel can be injected into second combustor 54 via fuel line 56 to increase the gas energy.

Gases leaving the second combustor 54 pass through turbine nozzle 56 and then through the blades of medium pressure turbine 58. Turbine 58 powers shaft 48 in consonance with turbine 46. Exhaust gases from turbine 58 are vented directly to the atmosphere via tail pipe 60 which is concentrically arranged with tail pipe 52.

Figure 4:
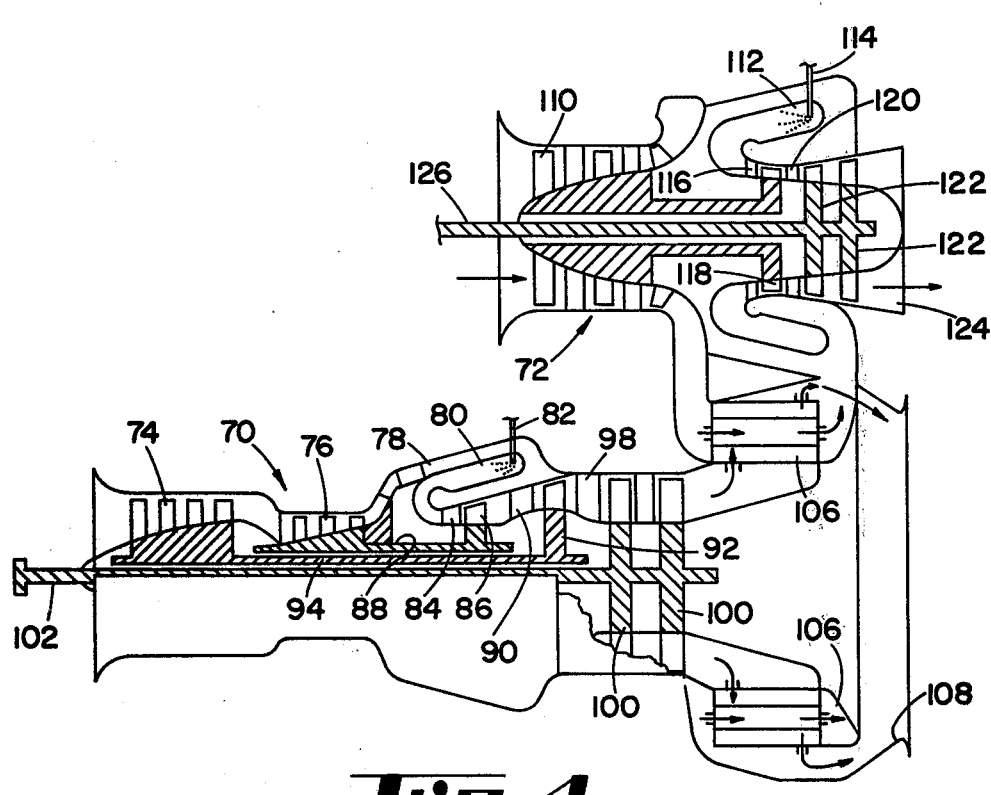
FIG. 4 is a cutaway view of the dual engine configuration schematically shown in FIG. 2.

The alternate engine system configuration shown in FIGS. 2 and 4 is similar to that shown in FIGS. 1 and 3. However, by selecting an independent low spool compressor and separate turbines a twin engine can be realized which can be of particular interest for twin engine application such as helicopters where a large portion of the mission time is in the part load range from 30 to 50% of maximum power. The arrangement shown in FIGS. 2 and 4 includes engine 70 which is an independent high pressure nonregenerative engine and engine 72 which is a low pressure regenerator engine which takes the heat from the exhaust of engine 70. In case of a failure in any engine component, the remaining engine can satisfy the mission requirement similar to that of a conventional twin-engine package. The overall component cost of this system is potentially comparable to that of a standard twin-engine package (because the costs for a high pressure spool and the heat exchanger are likely of the same magnitude).

Specifically, engine 70, shown in FIGS. 2 and 4, includes a high pressure compressor having compressor components 74 and 76. Pressurized air leaving the exit diffuser of compressor unit 76 follows annular duct 78 from which air flows into first combustor 80. Fuel is fed to combustor 80 by means of fuel line 82. The burned gases from combustor 80 pass through turbine nozzles 84 and then through the blades of high pressure turbine 86. Turbine 86 drives compressor 76 via hollow drive shaft 88. Gases leaving high pressure turbine 86 pass through second stage turbine nozzles 90 and thence through the blades of medium pressure turbine 92. Turbine 92 drives compressor 74 via shaft 94. Gases leaving turbine 92 pass through a third set of turbine nozzles 98 and then through turbine 100.

Power taken from turbine 100 via output shaft 102 serves to drive a load which could be a helicopter rotor (not shown) via a gearbox 104 (see FIG. 2).

The exhaust gases leaving turbine 100 passes through heat exchanger 106 before exiting through tail pipe 108. The heat energy collected by heat exchanger 106 is used to preheat the air entering the combustor of medium pressure ratio engine 72.

Engine 72 has at its input, a compressor 110 having a pressure ratio of about 6:1. Pressurized air leaving compressor 110 passes through heat exchanger 106 on it way to second combustor 112. Fuel is injected into combustor 112 via fuel line 114.

The burned gases from second combustor pass through turbine nozzles 116 and then through the blades of medium pressure turbine 118. Turbine 118 drives compressor 110. Gases leaving medium pressure turbine 118 pass through turbine nozzles 120 and then through turbine 122. The exhaust gases then exit via tail pipe 124. Power is taken from the turbine 122 via output shaft 126. This power could be used to power a load which is coupled to gearbox 128 (see FIG. 1). Gearboxes 104 and 128 can be parallel coupled to the same load as shown by dashed line 130 in FIG. 2.

Both dual cycle turbine systems have the common advantage that the regenerator does not limit the potential future increase in turbine inlet temperature if it is coupled with a corresponding increase of cycle pressure ratio. This increase in cycle pressure ratio with high turbine inlet temperature is not only desirable from a cycle standpoint (lowest SFC), but at the same time tends to keep the regenerator gas entry temperature nearly constant. With the configuration shown in FIGS. 3 and 4, there will be only a moderate pressure difference existing across the heat exchanger core enhancing the life of the core and minimizing potential leakage losses. Potential application envisioned for the dual cycle turbines include ground vehicles, aircraft and boats.

In the dual cycle turbine engine configuration shown in FIG. 4, it will be understood that connecting ducts and an appropriate manifold is needed to couple the energy gathered by the heat exchanger of engine 70 into the airstream coming from the compressor of engine 72.

While it will be apparent that the preferred embodiments of my invention fulfill the stated objectives, modifications, variations and changes can undoubtedly be made by those skilled in the art. It is therefore to be understood that the above described embodiments are not intended to limit the invention to the details and methods shown. Obviously, numerous modifications in the design, arrangement of parts and structure are possible within the spirit and scope of the invention.

I claim:

1. A dual cycle gas turbine engine system comprising: a high pressure ratio turbine engine section having a two-spool compressor, a fueled high pressure combustor, a first high pressure turbine stage for driving the second compressor spool, a second high pressure turbine stage for driving the first compressor spool and a third high pressure turbine stage for powering a load via an axially centered output shaft, said high pressure ratio engine section having an air intake at one end and an exhaust passage at its other end, said exhaust passage terminating at a first tailpipe;

a heat exchanger concentrically mounted in the exhaust passage of said high pressure ratio turbine engine section, said heat exchanger having first and second passage means, said first passage means serving to communicate spent products of combustion from the final turbine stage of said high pressure ratio turbine engine section to said first tailpipe; and a moderate pressure ratio turbine engine section having a moderate pressure compressor, a fueled moderate pressure combustor and moderate pressure turbine stages and including an axially centered output shaft for powering a load, said moderate pressure ratio turbine engine section having an air intake at one end and a second tailpipe at its other end, said moderate pressure ratio turbine engine section including passages for ducting air from said moderate pressure compressor through said secondary passage means of said heat exchanger to said moderate pressure combustor whereby the heat energy to the moderate pressure ratio engine section is increased because of the heat energy absorbed from the spent products of combustion being exhausted from said high pressure ratio turbine engine section.

2. The invention as defined in claim 1 wherein the two-spool high pressure compressor of said high pressure ratio turbine engine section is comprised of a moderate pressure ratio stage having a compressed air output, first ducting means conducting a portion of said compressed air from said first stage to said second compressor stage, second ducting means conducting the remainder of said compressed air to the second passage means of said heat exchanger whereby the first stage of the high pressure turbine engine section compressor also serves as the moderate pressure turbine section compressor.

3. The invention as defined in claim 2 wherein the output turbine stage of the moderate pressure ratio turbine engine section are cooperatively coupled to the output shaft of the high pressure ratio turbine engine section.

4. The invention as defined in claim 3 wherein the tailpipe of the high pressure ratio engine section is concentrically arranged in ringlike fashion around the tailpipe of the moderate pressure ratio engine section.

5. The invention as defined in claim 1 wherein the pressure ratio of the moderate pressure ratio turbine engine section is at least 4:1.

6. The invention as defined in claim 1 wherein the pressure ratio of the high pressure ratio turbine engine section is at least 16:1.

7. The invention as defined in claim 1 wherein the output shafts of both the moderate pressure ratio turbine engine section and the high pressure ratio turbine engine section are parallel coupled to a common load by gearbox means.

8. The invention as defined in claim 1 wherein fuel is selectively supplied only to said moderate pressure ratio turbine engine section whereby it carries the entire load at the output shaft when malfunction of components of high pressure engine section occurs.

* * * * *

UNITED STATES PATENT AND TRADEMARK OFFICE
CERTIFICATE OF CORRECTION

PATENT NO. : 4,147,024
DATED : April 3, 1979
INVENTOR(S) : Heinz F. Moellmann

It is certified that error appears in the above-identified patent and that said Letters Patent are hereby corrected as shown below:

Column 4, line 14, for "(see FIG. 1)", read--(see FIG. 2)--

Signed and Sealed this

Twenty-fifth Day of September 1979

[SEAL]

Attest:

Attesting Officer

LUTRELLE F. PARKER
*Acting Commissioner of Patents and Trademarks*